June 17, 1924.
F. S. LIVINGSTON
SINGLE LEVER GATE LOCK
Filed Sept. 17, 1921
1,498,460
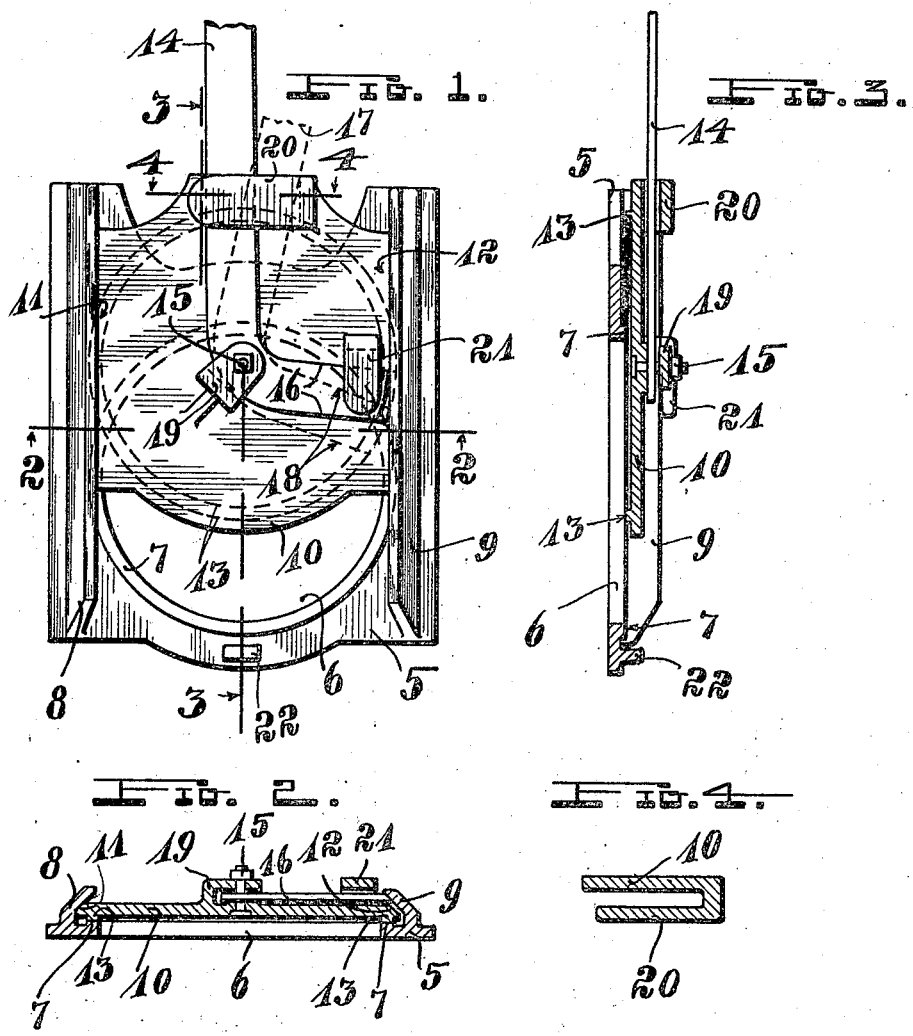
INVENTOR:
FRANK S. LIVINGSTON,
BY: Otto H. Krueger,
his Atty.

Patented June 17, 1924

1,498,460

UNITED STATES PATENT OFFICE.

FRANK S. LIVINGSTON, OF LOS ANGELES, CALIFORNIA, ASSIGNOR TO SNOW MANUFACTURING COMPANY, OF LOS ANGELES, CALIFORNIA.

SINGLE-LEVER GATE LOCK.

Application filed September 17, 1921. Serial No. 501,473.

*To all whom it may concern:*

Be it known that I, FRANK S. LIVINGSTON, a citizen of the United States, residing at Los Angeles, in the county of Los Angeles, and State of California, have invented a new and useful Single-Lever Gate Lock, of which the following is a specification.

This invention relates to devices for holding the cover plates of gate-valves in a desired position in relation to the seat of and the passage through the gate valve.

One of the objects of this invention is to provide a simple and durable locking mechanism which requires the least possible machine work.

Another object is to provide a gate valve (body and cover-plate) of such a design and construction that a simple lever can be used for locking the cover-plate in a desired position in relation to the body.

Other objects will appear from the following description and appended claims as well as from the accompanying drawing, in which—

Fig. 1 is a front elevation of the device.

Fig. 2 is a cross section on line 2—2 of Fig. 1.

Fig. 3 is a section on line 3—3 of Fig. 1.

Fig. 4 is a section on line 4—4 of Fig. 1.

Gate valves of the type illustrated in Fig. 1 are used very much in irrigation systems. In an irrigating system, however, the pressure is normally not very great. On the other hand, many valves are usually necessary in a single system, and it is therefore very important and advantageous to provide valves of this type of the simplest but most durable construction, so as to be inexpensive but satisfactory for the purpose.

The base-plate 5 is provided with an aperture 6 to form the passage through the valve. The edge, surrounding the aperture, is provided with a bead or slightly raised surface 7 to form the valve seat. Projecting towards the same side of the base-plate, flanges or guides 8 and 9 are provided to form guideways for the cover-plate of the device. These flanges are preferably arranged parallel to each other past the passage in the base-plate. The seat 7 is raised above the surface of the base-plate 5 to facilitate the machining of the seat, in case the base-plate is made of cast-iron. Such a raised seat is, however, not absolutely necessary, since a casting may be machined without having any special provision for it. The cover-plate 10, having the edges 11 and 12, is designed to slide easily between the flanges 8 and 9. A suitable face or surface 13 is provided on the cover-plate to engage with the seat on the base-plate 5. A lever 14 is pivotally engaged with the cover-plate at 15, the lever having a side extending end 16 to engage with one of the guiding flanges.

In the illustration in Fig. 1, the cover-plate is locked in a partly open position with relation to the passage or aperture 6 through the base-plate.

The lever 14 can be moved over to the position indicated in dotted lines at 17, so as to bring the side extension end 16 to the position indicated in dotted lines at 18. When the lever is in this position, the cover-plate can be moved freely up and down between the flanges 8 and 9, in the guideways of the base-plate, as is more clearly illustrated in Fig. 2. The cover-plate is of such a width that the edges 11 and 12 are normally slightly spaced from the flanges 8 and 9. As soon as the lever 14 is moved to bring the end 16 to engage with the flange 9, the cover-plate is pushed or shifted over to bring the edge 11 of the cover-plate into engagement with the flange 8 of the base-plate 5. In moving the lever into engagement with one of the flanges of the base-plate, the cover-plate is locked within the guideways of the base-plate. When the lever is free from engagement with the base-plate, the cover-plate is free to be moved within the guideways of the base-plate.

The edges 11 and 12 of the cover-plate 10 are preferably beveled, and the flanges 8 and 9 are preferably shaped accordingly to cause a pressing of the cover-plate against the seat when the lever with its end 16 and the cover-plate with its edge 11 engage under the flanges 8 and 9.

The lug 19 is provided on the cover-plate to facilitate the pivot connection between the lever and the cover-plate. The lugs 20 and 21 are provided on the cover-plate for guiding the lever and to limit the movements of the same in relation to the cover-plate. The lug 21 is provided on the base-plate 5 to limit the sliding movement of the cover-plate in its lowermost and seating position in relation to the base-plate.

In irrigating systems, gate-valves of this type are very often used quite a distance below the surface and within stand pipes, or other restricted areas, so that the replacing of the cover-plates within the guideways of the base-plates is not always convenient if the cover-plates have been removed from the guideways for any purpose.

Swinging around its pivot at 15 in one direction, the lever is limited in its movement by the lug 20 when the lever reaches the position indicated in dotted lines at 17, while, if swinging in the opposite direction, the lever is limited in its movement at a point when the end 16 reaches the base of the lug 21, as will easily be understood from the illustration in Fig. 1.

The cover-plate can under these conditions easily be lowered into proper position within the guide ways of the base-plate while hanging on the lever, since the cover-plate is in nearly correct aligning position when so hanging on the lever, so as to easily slip into the guide ways as soon as the edges 11 and 12 reach a point on the upper end of the base-plate between the guide ways.

Having thus described my invention, I claim:

1. In a valve, a base-plate having an aperture therethrough forming a valve seat and having guideways spaced from the face of the valve seat over opposite sides of the valve seat, a cover-plate disposed for a sliding movement over the aperture in the base-plate between and under the guideways, and a lever pivotally engaged with the cover-plate for a swinging movement in a plane practically parallel to the face of the valve seat having a handle portion projecting upwardly from the pivot point in the general direction of the sliding movement and having an extension end projecting from the pivot point transverse to the movement of the cover-plate terminating in a wedge-like portion between one of the guideways and the cover-plate so as to press the cover-plate at this point against the valve seat and adapted to force the cover-plate transversely over the valve seat to wedge itself between the valve seat and the opposite guideways.

2. In a valve, in combination with a base-plate having an aperture therethrough with a valve seat formed on one side of the plate and having guideways on opposite sides of the valve seat and on the same side of the plate, and a cover-plate slidingly disposed over the valve seat between the guideways; an operating lever pivotally engaged with the cover-plate having means to project between one of the guideways and the cover-plate so as to press the cover-plate at this point against the valve-seat in the base-plate and adapted to shift the cover-plate to project and wedge itself in a similar manner between the opposite member of the guideways and the cover-plate so as to press the cover-plate on the opposite side also against the valve-seat of the base-plate.

3. In a gate-valve, an operating lever in form of a bell crank having a common pivot point for two lever-members, one member forming the handle portion and the other member terminating in a wedge-like portion with the forward-projecting edge of the wedge practically parallel to the longitudinal axis of the handle portion for sidewise wedging actions transversely to the pivot-axis.

4. In a gate-valve, a cover-plate having an engaging face on one side and having lugs on the opposite side for supporting and guiding an operating lever, the lugs having each a portion projecting laterally from the cover-plate at practically right angles to the engaging face and having each another portion practically parallel to the engaging face for guiding and controlling the movements of an operating lever.

In testimony that I claim the foregoing as my invention I have signed my name in the presence of two subscribing witnesses.

FRANK S. LIVINGSTON.

Witnesses:
  O. H. KRUEGER,
  JESSIE A. MANOCK.